(12) United States Patent
Uttamchandani et al.

(10) Patent No.: US 9,183,151 B2
(45) Date of Patent: Nov. 10, 2015

(54) THREAD CACHE ALLOCATION

(71) Applicant: VMware, Inc., Palo Alto, CA (US)

(72) Inventors: Sandeep Uttamchandani, Cupertino, CA (US); Li Zhou, Campbell, CA (US); Fei Meng, Raleigh, NC (US); Deng Liu, San Jose, CA (US)

(73) Assignee: VMware, Inc., Palo Alto, CA (US)

(*) Notice: Subject to any disclaimer, the term of this patent is extended or adjusted under 35 U.S.C. 154(b) by 203 days.

(21) Appl. No.: 14/015,784

(22) Filed: Aug. 30, 2013

(65) Prior Publication Data
US 2015/0067262 A1   Mar. 5, 2015

(51) Int. Cl.
*G06F 12/08* (2006.01)
*G06F 9/50* (2006.01)

(52) U.S. Cl.
CPC .............. *G06F 12/0848* (2013.01); *G06F 9/50* (2013.01); *G06F 12/08* (2013.01)

(58) Field of Classification Search
CPC ................................... G06F 12/0848
USPC ....................................... 711/129
See application file for complete search history.

(56) References Cited

U.S. PATENT DOCUMENTS

2013/0013866 A1* 1/2013 Hsu et al. ...................... 711/136

OTHER PUBLICATIONS

Qureshi et al., "Utility-Based Cache Partitioning: A Low-Overhead, High-Performance, Runtime Mechanism to Partition Shared Caches", The 39th Annual IEEE/ACM International Symposium on Microarchitecture, 2006.*
Bcache. (May 9, 2013). Retrieved Jul. 11, 2013, from http://bcache.evilpiepirate.org/.
Byan, S., Lentini, J., Madan, A., Pabon, L., Condict, M., Kimmel, J., Kleiman, S., Small, C., & Storer, M. (2012). Mercury: Host-side Flash Caching for the Data Center. 2012 IEE. 978-1-4673-1747-4/12.
EMC VFCache. (Feb. 6, 2012). EMC VFCache Signifies a New Era for Enterprise Flash Technology—Makes Leap from Storage to Server [Press Release]. Retrieved Jul. 11, 2013, from http://www.emc.com/about/news/press/2012/20120206-01.htm.
EMC VFCache. (2012). Server Flash cache for superior performance, intelligence, and protection of mission-critical data. Published in the USA. May 12 Data Sheet H9581.1.
Hogan, C. (Dec. 11, 2012). Virtual Flash (vFlash) Tech Preview [Web log post]. Retrieved Jul. 11, 2013, from http://blogs.vmware.com/vsphere/2012/12/virtual-flash-vflash-tech-preview.html.
ioTurbine: Fusion-io. (2013). Intelligent Virtualization Performance. Retrieved Jul. 11, 2013, from http://www.fusionio.com/products/ioturbine/.

(Continued)

*Primary Examiner* — Matthew Bradley
*Assistant Examiner* — Zubair Ahmed

(57) ABSTRACT

Systems and techniques are described for thread cache allocation. A described technique includes monitoring input and output accesses for a plurality of threads executing on a computing device that includes a cache comprising a quantity of memory blocks, determining a respective reuse intensity for each of the threads, determining a respective read ratio for each of the threads, determining a respective quantity of memory blocks for each of the partitions by optimizing a combination of cache utilities, each cache utility being based on the respective reuse intensity, the respective read ratio, and a respective hit ratio for a particular partition, and resizing one or more of the partitions to be equal to the respective quantity of the memory blocks for the partition.

20 Claims, 5 Drawing Sheets

(56) References Cited

OTHER PUBLICATIONS

Proximal Data. (2013). AutoCache—Using Flash Devices to Easily Remove I/O Bottlenecks for Greater Virtual Machine Density and Efficiency.
Proximal Data. AutoCache with I/O Intelligence. Retrieved Jul. 11, 2013, from http://proximaldata.com/product/AutoCache.php.
Saab, P. (Apr. 27, 2010). Releasing Flashcache [Web log post]. Retrieved Jul. 11, 2013, from http://www.facebook.com/note.php?note_id=388112370932.
SanDisk. (2013). FlashSoft 3.1 for VMware vSphere—Migrate Business Critical Applications to Virtual Infrastructures. Retrieved Jul. 11, 2013, from http://www.sandisk.com/products/flashsoft/vSphere/.
SanDisk. (2013). FlashSoft 3.2 for Linux—Get SSD Performance with Linux Servers. Retrieved Jul. 11, 2013, from http://www.sandisk.com/products/flashsoft/linux/.
SanDisk. (2013). FlashSoft 3.2 for Windows Server—Accelerate Your Servers. Retrieved Jul. 11, 2013, from http://www.sandisk.com/products/flashsoft/windows/.
SanDisk. (2013). FlashSoft Software—Reduce I/O Latency to Increase Server and Storage Performance. Retrieved Jul. 11, 2013, from http://www.sandisk.com/products/flashsoft/.
Sanrad—SANRAD VXL. (2009) SANRAD VXL Software—Accelerate Virtual Machines with Host Based Flash. Retrieved Jul. 11, 2013, from http://www.sanrad.com/VXL/4/1/8.
Wikipedia. Fusion-io. Retrieved Jul. 11, 2013, from https://en.wikipedia.org/wiki/Fusion-io.

* cited by examiner

| Cache Log | | | | 300 |
|---|---|---|---|---|
| Sequence Number 302 | Operation Type 304 | Memory Address 306 | IO Request Size 312 | Timestamp 314 |
| 1  308a | Read | 25 | 4k | 13:49:57 |
| 2  310a | Read | 35 | 4k | 13:49:25 |
| 3 | Write | 11 | 4k | 13:49:06 |
| 4 | Read | 63 | 4k | 13:48:59 |
| ⋮ | ⋮ | ⋮ | ⋮ | ⋮ |
| 998 | Read | 13 | 4k | 13:48:19 |
| 999 | Write | 48 | 4k | 13:48:12 |
| 1000  308b | Read | 25 | 4k | 13:31:13 |
| 1001 | Read | 12 | 4k | 13:31:11 |
| 1002 | Write | 29 | 12k | 13:30:42 |
| 1003  310b | Read | 35 | 4k | 13:30:18 |
| ⋮ | ⋮ | ⋮ | ⋮ | ⋮ |

FIG. 3

THREAD CACHE ALLOCATION

BACKGROUND

This document relates to allocating cache memory to multiple threads executing on a computer.

A virtual machine is a software-based abstraction of a physical computer system. In general, a computer program that can be executed on a physical computer system can be executed in a virtual machine using virtualization software. Virtualization software is software that is logically interposed and interfaces with a virtual machine and a physical computer system. Each virtual machine is configured to execute an operating system, referred to herein as a guest OS, and applications. A physical computer system, referred to herein as a host machine, can execute one or more virtual machines.

A virtual machine can be accessed locally or remotely, through a network connection. For example, it is possible to use a remote desktop client to access a virtual machine remotely. A remote desktop client is a computer program that communicates user interface information with a remote computer system. Generally, the user interface information includes display data, which is received from the remote computer system and displayed on the computer local to the user, and sends keyboard and mouse inputs generated by the user to the remote computer system. In this way, applications executing remotely from the user can be accessed and interacted with by the user.

SUMMARY

In general, one aspect of the subject matter described in this document can be embodied in a technique that includes monitoring input and output accesses for a plurality of threads executing on a computing device that includes a cache comprising a quantity of memory blocks, each of the threads being associated with a respective partition including a first respective quantity of the memory blocks, each memory block being included in only one of the respective partitions, determining a respective reuse intensity for each of the threads, the reuse intensity being based on, at least, a quantity of unique memory blocks in the respective partition of the thread that have been read during a first period of time, determining a respective read ratio for each of the threads, the read ratio being based on the input and output accesses for the thread, determining a second respective quantity of memory blocks for each of the partitions by optimizing a combination of cache utilities, each cache utility being based on the respective reuse intensity, the respective read ratio, and a respective hit ratio for a particular partition wherein the respective hit ratio is a ratio of a total number of cache hits given a variable quantity of memory blocks and a total number of input and output accesses during a second period of time for the thread associated with the particular partition, and resizing one or more of the partitions to be equal to the second respective quantity of the memory blocks for the partition.

These and other aspects can optionally include one or more of the following features. Determining the second respective quantity of memory blocks for each of the partitions may comprise determining a latency of the cache based on a time to complete each of the input and output accesses, and determining the cache utility for each of the threads using a combination of the hit ratio, the variable quantity of memory blocks, the reuse intensity, the read ratio, and the latency of the cache. The cache utility CU for the partition associated with thread I may be $CU_i = l \times RR_i \times (H_i(s) + \alpha RI_i)$ where H is the hit ratio, s is the variable quantity of memory blocks, RI is the reuse intensity, RR is the read ratio, l is the latency of the cache, and is an adjustable weight.

In some implementations, determining the second respective quantity of memory blocks for each of the partitions comprises determining a reuse distance for each memory block, the reuse distance for a particular memory block representing a quantity of distinct memory blocks accessed between the two most recent consecutive accesses of the particular memory block, determining the total number of cache hits for each of the threads given the reuse distances for the memory blocks included in the corresponding partition and the second respective quantity of memory blocks for the corresponding partition, generating the respective hit ratio for each of the threads, and maximizing a sum of the cache utilities for all of the threads by repeating the determination of the total number of cache hits, the generation of the estimated hit ratio, and the determination of the cache utility for at least one of the threads. Maximizing the sum of the cache utilities may comprise multiplying the cache utilities by corresponding priority weights, and maximizing a sum of the weighted cache utilities. Determining the cache utility for each of the threads may comprise normalizing the reuse intensity for each of the threads, wherein RI is the normalized reuse intensity. The reuse intensities for all of the threads may be determined for the same period of time. Normalizing the reuse intensity may comprise normalizing the reuse intensity based on a greatest reuse intensity from the reuse intensities for all of the threads, a value of the greatest reuse intensity greater than or equal to the values of the other reuse intensities.

In some implementations, determining the respective reuse intensity for each of the threads comprises determining a quantity of unique memory blocks Sunique in the respective partition that have been read during the first period of time, and determining a total size of all memory blocks read Stotal in the respective partition during the first period of time, and wherein the respective reuse intensity RI for a thread i is determined from a combination of the quantity of unique memory blocks $S_{unique}$, the total size of all memory blocks read $S_{total}$, and a duration of the first period of time $t_w$. The respective reuse intensity RI for a thread i may be $RI_i = S_{total}/(t_w * S_{unique})$.

In some implementations, each partition includes a current size and a target size, and resizing one or more of the partitions to be equal to the second respective quantity of memory blocks for the partition comprises setting the target size for the partition to the second quantity of memory blocks for the partition. Resizing one or more of the partitions to be equal to the second respective quantity of memory blocks for the partition may comprise adjusting the current size of the partition based on the target size of the partition and the thread associated with the partition requesting data from the partition. Monitoring the input and output accesses may comprise intercepting each input and output request associated with the threads, and recording information associated with each of the input and output requests, the information including whether the respective request is a read or a write request, a size of the requested data, whether the requested data is cached, and a request latency. The latency may comprise an average latency for the cache. The adjustable weight for each of the threads may be based on a type of cache access for which the corresponding partition is used.

Particular embodiments of the subject matter described in this document can be implemented so as to realize one or more of the following advantages. In some implementations, the use of a cache utility reduces total cost of ownership and/or backend saturation. In some implementations, the use of a cache utility increases system scalability. In some implementations, the speed of change in the cache partition size allocation is controlled by the activity level of a virtual machine. In some implementations, ping-pong effects are minimized given the incremental change in allocation of memory blocks to cache partitions.

The details of one or more embodiments of the subject matter described in this document are set forth in the accompanying drawings and the description below. Other features, aspects, and advantages of the subject matter will become apparent from the description, the drawings, and the claims.

BRIEF DESCRIPTION OF THE DRAWINGS

FIG. 3 is an example of a cache log.

Like reference numbers and designations in the various drawings indicate like elements.

DETAILED DESCRIPTION

This document describes a framework to allocate cache memory to virtual machines to improve cache hit ratios for the virtual machines. Such a framework may enable a server to dynamically resize a cache partition allocated to a virtual machine based on the priority of the virtual machine, the locality of requested data, and input and output access characteristics, among other properties.

For example, rather than allocate a static cache partition to a virtual machine, the server may monitor the cache use of all virtual machines executing on the server and dynamically adjust the size of one or more cache partitions associated with the virtual machines based on the cache usage. The server may determine a reuse intensity for each of the virtual machines to measure the burstiness of cache hits, e.g., whether cache hits are distributed approximately evenly over time or whether there is a large quantity of cache hits followed by fewer cache hits. The server may then determine a cache utility for each of the virtual machines using the reuse intensities and cache hit ratios to optimize the sizes of each of the cache partitions associated with the virtual machines. For example, the server may optimize a sum of the cache utilities for all of the virtual machines to determine a global maximum for the sum of the cache utilities, and adjust one or more cache partition sizes based on the cache utilities.

Figure 1:
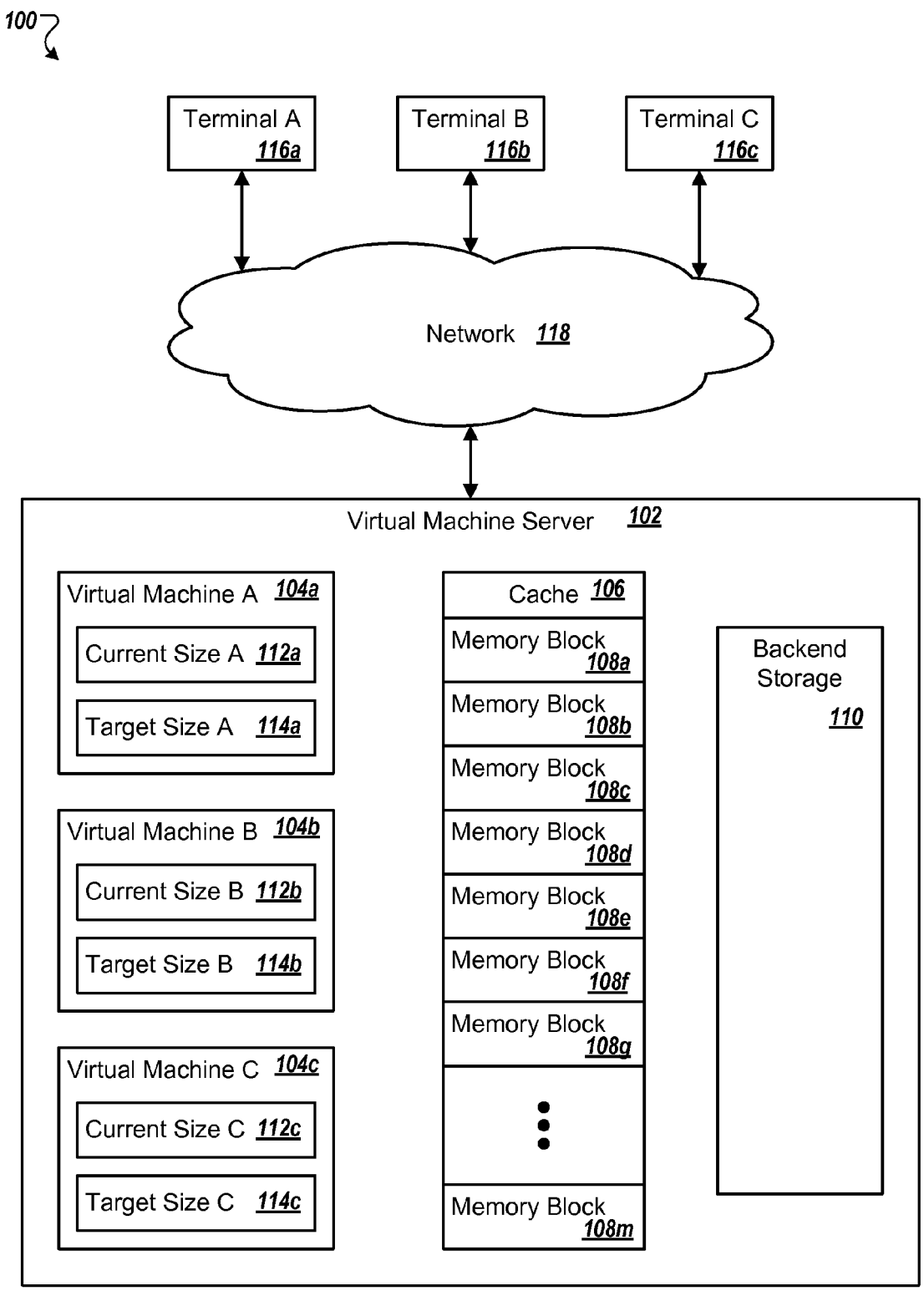
FIG. 1 shows an example environment of virtual machines associated with cache memory blocks.

FIG. 1 shows an example environment 100 of virtual machines associated with cache memory blocks. The environment 100 includes a virtual machine server 102 executing three virtual machines, virtual machine A 104a, virtual machine B 104b, and virtual machine C 104c, each of which are associated with a partition of memory blocks from a cache 106. For example, the cache 106 contains multiple memory blocks 108a-m that cache data from a backend storage 110, and provides the data to the virtual machines 104a-c upon request. As the cache 106 provides the data to the virtual machines 104a-c, the virtual machine server 102 monitors the input and output accesses to the memory blocks 108a-m and adjusts the sizes of the cache partitions associated with the virtual machines 104a-c based on the usage of the cache 106.

Each of the virtual machines 104a-c includes a current size 112a-c and a target size 114a-c for the cache partition associated with the virtual machines 104a-c. The current sizes 112a-c indicate the size of the cache partition currently associated with the respective virtual machine 104a-c and the target sizes 114a-c indicate whether the current sizes 112a-c for the cache partitions need to be adjusted.

For example, when a terminal A 116a accesses the virtual machine A 104a and requests data from the virtual machine A 104a, e.g., for presentation on a display of the terminal A 116a, the virtual machine A 104a may first determine whether all or a portion of the requested data is stored in the cache partition A associated with the virtual machine A 104a. In this example, the cache partition A associated with the virtual machine A 104a includes the memory blocks 108a-d, the cache partition B associated with the virtual machine B 104b includes the memory blocks 108e-f, and the cache partition C associated with the virtual machine C 104c includes the memory blocks 108g-m, where the cache 106 contains a total of m memory blocks.

The virtual machine server 102 records information associated with the data request by the virtual machine A 104a from the cache partition A and/or the backend storage 110, and determines whether the target size A 114a of the cache partition A should be adjusted. For example, when the virtual machine server 102 determines that the virtual machine A 104a often retrieves data from the cache partition A while the virtual machine C 104c retrieves data from the cache partition C less frequently, the virtual machine server 102 may determine that the target size A 114a for the cache partition A should be increased while the target size C 114c for the cache partition C should be decreased.

When one of the virtual machines 104a-c requests data from the cache 106, the virtual machine server 102 determines whether the current size associated with the virtual machine is small than the target size. If the current size is greater than or equal to the target size, the virtual machine server 102 does not adjust the current size or cache partition associated with a corresponding virtual machine. Continuing the example above, if the virtual machine C 104c requests data from the cache 106, the virtual machine server 102 determines that the current size C 112c is greater than the target size C 114c and does not adjust the current size C 112c.

If a virtual machine's current size is less than the virtual machine's target size, the virtual machine server 102 allocates one or more blocks to the virtual machine's cache partition. For example, if the virtual machine A 104a requests data from the cache partition A and the virtual machine server 102 determines that the current size A 112a is less than the target size A 114a, the virtual machine server 102 reclaims a block from the cache 106, by identifying a block associated with a cache partition where the current size is greater than the target size, e.g., a block from the cache partition C, and allocates the reclaimed block to the cache partition A.

In some implementations, when the virtual machines 104a-c are assigned priority levels, when the virtual machine server 102 reclaims a block, the virtual machine server 102 identifies a block included in a cache partition associated with the lowest priority virtual machine where the current size is greater than the target size. For example, if the virtual machine B 104b has a lower priority than the virtual machine C 104c and the current sizes for both virtual machines are greater than the corresponding target sizes, the virtual machine server 102 would reclaim a block from the cache partition B and allocated the reclaimed block to the cache partition A.

The terminals 116a-c may include personal computers, mobile communication devices, and other devices that can send and receive data over a network 118. The network 118, such as a local area network (LAN), wide area network (WAN), the Internet, or a combination thereof, connects the terminals 116a-c and the virtual machine server 102.

In some implementations, when the virtual machine server 102 initially executes a virtual machine, the virtual machine server 102 associates a default size for the target size of the virtual machine's cache partition. Over time, as the virtual machine server 102 monitors the cache usage of the virtual machines, the virtual machine server 102 allocates memory blocks to and reclaims memory blocks from the virtual machine and adjusts the cache partition sizes for the virtual machine based the cache usages of all the virtual machines.

Figure 2:
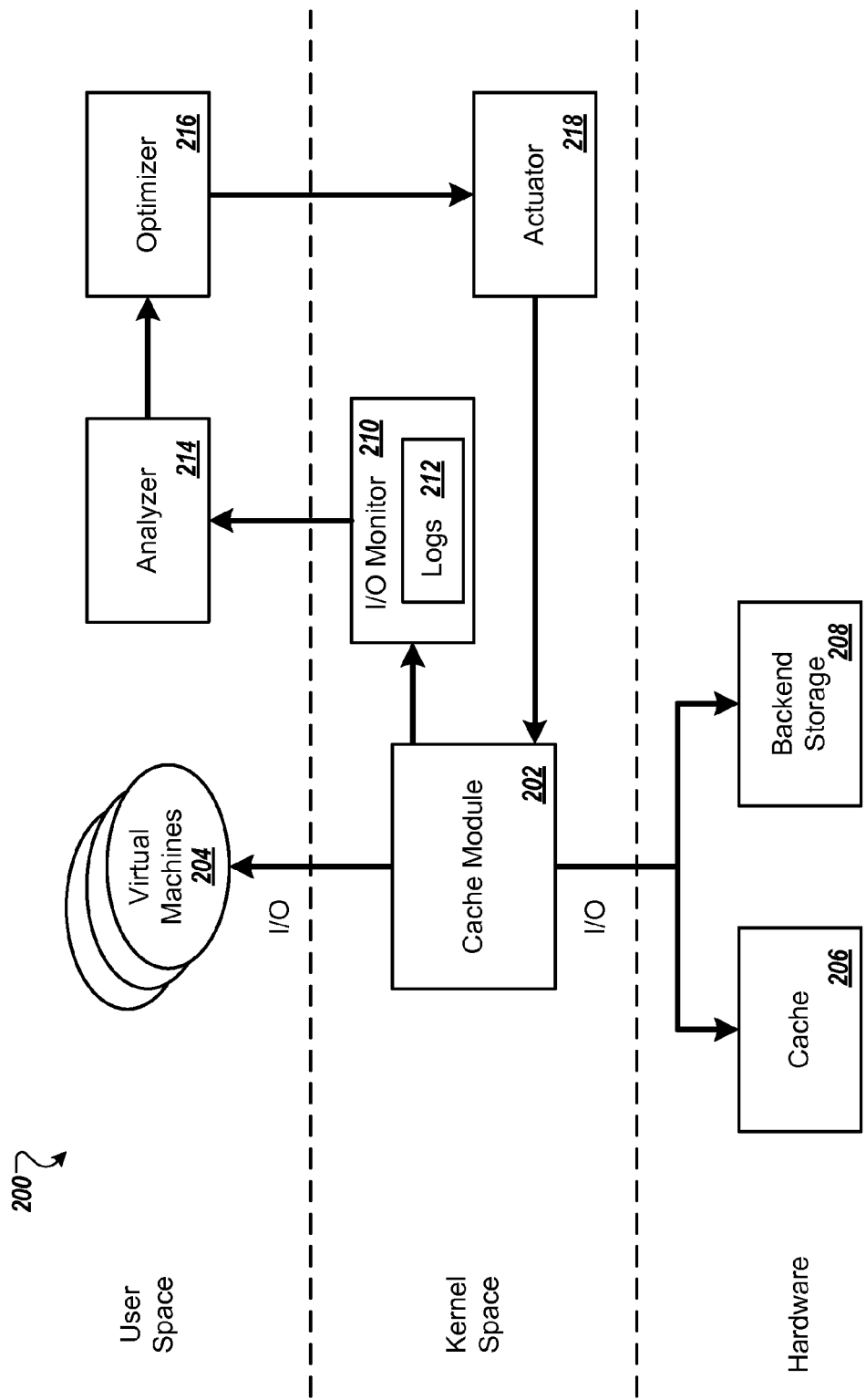
FIG. 2 shows an architecture for an example of a system that is configured to monitor cache usage and adjust cache partition sizes.

FIG. 2 shows an architecture for an example of a system 200 that is configured to monitor cache usage and adjust cache partition sizes. For example, the system 200 may be a part of the virtual machine server 102, shown in FIG. 1.

The system 200 includes a cache module 202 that provides data management for a plurality of virtual machines 204. For example, the cache module 202 receives data requests from the virtual machines 204, determines whether the requested data is stored in a cache 206 or on a backend storage 208, and provides the requested data to the corresponding virtual machine.

The cache module 202 provides an I/O monitor 210 with information regarding the data requests. For example, the I/O monitor 210 may intercept the data requests received by the cache module 202 and store information about the data requests in input and output logs 212. In some examples, the cache module 202 provides the I/O monitor 210 with the input and output logs 212 where the input and output logs 212 indicate the types of data requests the cache module 202 received from the virtual machines 204 and other properties associated with the data requests.

In some implementations, the input and output logs 212 include data associated with accesses to the cache 206. In some examples, the input and output logs 212 include data associated with accesses to both the cache 206 and the backend storage 208.

The I/O monitor 210 provides data from the input and output logs 212 to an analyzer 214 that periodically processes information from the input and output logs 212 to determine data access characteristics. For example, the data access characteristics may be access characteristics for a specific virtual machine, such as a hit ratio, or access characteristics for the system 200, such as a latency of the cache 206.

The analyzer 214 may determine a cache utility model for each of the virtual machines 204. For example, the cache utility CU for a virtual machine i may be $CU_i = l \times RR_i \times (H_i(s) + \alpha RI_i)$, where H is a hit ratio, s is a target partition size, RI is a reuse intensity, RR is a read ratio, l is cache latency, and α is an adjustable weight for the virtual machine.

The analyzer 214 determines the cache latency/as an average latency of the cache 206 for all of the virtual machines 204. In some implementations, the analyzer 214 determines the cache latency/for each of the virtual machines separately. For example, for a virtual machine i, the analyzer 214 determines a cache latency $l_i$ for the virtual machine. The analyzer may use any appropriate algorithm to determine the latency of the cache 206.

The analyzer 214 determines the read ratio based on the percent of data accesses that are read requests out of all the data requests for a particular virtual machine. For example, for a given virtual machine i, where the virtual machine sends a total of x data requests to the cache module 202 where data responsive to the requests is stored in the cache 206 and y of the data requests are read requests, the analyzer 214 would determine the read ratio for the virtual machine i as $RR_i = y/x$, where y is less than x. The analyzer 214 may use any appropriate algorithm to determine the read ratio for a virtual machine.

The analyzer 214 may determine the reuse intensity RI for a virtual machine i as $RI_i = S_{total}/(*S_{unique})$ where $t_w$ is a duration of a first period of time, $S_{unique}$ is a quantity of unique memory blocks in the respective cache partition that have been read during the first period of time, and $S_{total}$ is a total size of all memory blocks read in the respective cache partition during the first period of time. For example, when the duration of the first period of time is 5 minutes, a virtual machine i accesses 1000 unique memory blocks during the previous 5 minute period, and the total size of the blocks accessed in the 5 minute period is 1G, then the reuse intensity $RI_i = 1G/(1000*5 \text{ minutes})$. The analyzer 214 may use any appropriate algorithms to determine the reuse intensity for a virtual machine.

In some implementations, the total size of all memory blocks read is the total size of the all memory blocks read during the first period of time. In these implementations, if the virtual machine accesses the same memory block more than once, the size of the memory block is included in the total size $S_{total}$ for each time the memory block is accessed. In some examples, the total size $S_{total}$ includes the size of each unique memory block accessed.

The analyzer 214 provides the cache utilities for each of the virtual machines to an optimizer 216 that determines a current optimal cache partitioning plan based on the cache utilities. For example, the optimizer 216 determines a current optimal cache partitioning plan based on the input and output logs 212. In some examples, the optimizer 216 determines a maximum for a sum of the cache utilities $\Sigma_{i=1}^{n} priority_i * CU_i$ for n virtual machines where the target partition sizes s satisfy the constraint $s_1 + s_2 + \ldots + s_n = S$, where S is the total available cache size, e.g., the total number of memory blocks in the cache 206, and priority is the priority of the virtual machine, e.g., as determined by an administrator or a user.

The optimizer 216 may determine multiple hit ratios H for each of the virtual machines i, e.g., iteratively, to identify the maximum of the sum of the cache utilities. For example, the analyzer 214 may determine the hit ratio H(s) as a ratio of the total number of cache hits for a target partition size s and a total number of input and output accesses during a second period of time.

In some implementations, the total number of cache hits is an estimated number of cache hits based on a particular value of the target partition size s. For example, the analyzer 214 may determine the reuse distance of each entry in the input and output logs 212 as described below with reference to FIG. 3. The optimizer 216 may then use all of the reuse distances associated with a virtual machine to determine the hit ratio for a given target partition size s, and the cache utility for the corresponding virtual machine.

The optimizer 216 then determines the cache utilities for all of the remaining virtual machines and the sum of the cache utilities. By adjusting the target partition sizes s for two or more of the virtual machines and determining the sum of the cache utilities based on the adjusted partition sizes, the optimizer 216 may determine a global optimum for the target partition sizes that maximizes the sum of the cache utilities such that the system 200 may adjust the sizes of the cache partitions associated with each of the virtual machines 204 based on the optimum target partition sizes.

For example, when the system 200 includes three virtual machines and the current cache partition sizes of the virtual machines are four memory blocks, two memory blocks, and six memory blocks respectively, the optimizer 216 may determine a first set of target partition sizes as five memory blocks, two memory blocks, and five memory blocks associated with a cache utility sum of 0.4. The optimizer 216 may then determine a second set of target partition sizes as seven memory blocks, three memory blocks, and two memory blocks with a cache utility sum of 0.45, and a third set of target partition sizes as six memory blocks, two memory blocks, and four memory blocks with a cache utility sum of 0.43. In this example, the optimizer 216 selects the values in the second set of target partition sizes as the new target sizes for the cache partitions associated with the virtual machines 204, e.g., where the new target sizes are seven memory blocks, three memory blocks, and two memory blocks respectively.

An actuator 218 receives the target partition sizes s from the optimizer 216 and associates the target partition sizes s with the virtual machines 204. As the virtual machines 204 request data from the cache module 202, the cache module 202 compares the current cache partition sizes with the target partition sizes and adjusts the sizes of the cache partitions associated with the virtual machines 204.

In the example shown in FIG. 2, the analyzer 214 and the optimizer 216 are implemented in user space on the system 200 and the cache module 202, the I/O monitor 210, and the actuator 218 are implemented in kernel space. In other implementations, the cache module 202, the I/O monitor 210, the analyzer 214, the optimizer 216, and the actuator 218 may be implemented in either user space or kernel space.

In some implementations, the system 200 includes a minimum cache partition size and/or a maximum cache partition size. For example, the minimum cache partition size may be one memory block. In some examples, the maximum cache partition size is small enough to ensure that each of the virtual machines is associated with at least one memory block. For example, if the cache 206 includes twelve memory blocks and the system 200 includes three virtual machines 204, then the maximum cache partition size is ten. In some implementations, the system 200 or an administrator may set the minimum or the maximum cache partition size to other values.

In some implementations, the maximum cache partition size is a dynamic value. For example, when the system 200 executes a new virtual machine, the maximum cache partition size may decrease and when one of the virtual machines 204 is terminated, the maximum cache partition size may increase.

In some implementations, the hit ratio has a value between zero and one. In some implementations, the reuse intensity has a value between zero and one.

FIG. 3 is an example of a cache log 300. For example, the I/O monitor 210 from FIG. 2 may generate the cache log 300 using data received from the cache module 202.

The cache log 300 includes a sequence number 302 for each record in the cache log 300. The sequence number 302 indicates the position of each record in the cache log 300. For example, when the cache log 300 is associated with a single virtual machine, the first record includes data associated with a first data request received by the cache module 202 from the virtual machine, the second record includes data associated with a second data request received by the cache module 202, and so on.

An operation type value 304 for each record indicates whether the request is a read request or a write request. The system 200 may use the operation type value 304 to determine the read ratio for a particular virtual machine. For example, when the cache log 300 includes data associated with a single virtual machine, the analyzer 214 may use the operation type values 304 to determine the read ratio for the virtual machine. The example shown in FIG. 3 includes ten records, not including records represented by the ellipses, where seven of the ten records are read requests. In this example, the virtual machine associated with the cache log 300 would have a read ratio of seventy percent, e.g., seven divided by ten.

The records in the cache log 300 include a memory address 306 that allows the system to determine a reuse distance RD for each of the memory blocks. For example, a memory block with the address "25" is included in the cache log 300 in the first record 308a and the one-thousandth record 308b, assuming no intermediate records are associated with the memory block "25," and would have a reuse distance RD, representing the number of distinct blocks accessed between the two consecutive uses of that block, of 998. Further, a memory block with the address "35" is included in the cache log 300 in the second record 310a and the one-thousand and third record 310b, assuming no intermediate records are associated with the memory block "35," and would have a reuse distance RD of 1000.

An IO request size 312 value, associated with each of the records in the cache log 300, indicates the size of the data requested. For example a virtual machine may request data stored in a single memory block, e.g., four kilobytes, or multiple memory blocks, e.g., twelve kilobytes.

A timestamp 314 for each of the records in the cache log 300 allows the system 200 to determine a temporal locality TL for each of memory blocks in a cache partition associated with a virtual machine. For example, the temporal locality TL for the memory block "25" is 18:44 based on the first record 308a and the one-thousandth record 308b being associated with the memory block "25," assuming no intermediate records are associated with the memory block "25," e.g., 13:49:57 minus 13:31:13.

The system 200 may use the IO request size 312, the memory addresses 306, and the timestamps 314 to determine the reuse intensity for a virtual machine. For example, the system may determine that the duration of the predetermined period of time is five minutes, and use the first record through the nine-hundred and ninety-ninth record when determining the reuse intensity for the virtual machine.

Assuming that all of the records represented by the first ellipse are records for unique memory blocks, the virtual machine associated with the cache log 300 would have a hit ratio of 0.1% for a target cache partition size of 1000, e.g., (1/1000)*100%, and 0.199% for a target cache partition size of 1003, e.g., (2/1003)*100%, when both read and write accesses are included in calculations.

In some implementations, the reuse intensity and/or the read ratio are determined based on only read access entries in the cache log 300. For example, when only read access entries from the cache log 300 are used and assuming that 50% of the entries in the cache log 300 are for write accesses, the virtual machine would have a hit ratio of 0.2% for a target cache partition size of 500, e.g., (1/500)*100%, and would have a hit ratio of 0.398% for a target cache partition size of 502, e.g., (2/502)*100%.

In the example shown in FIG. 3, the most recent data requests are recorded at the top of the cache log 300. In some implementations, the most recent data requests are recorded at the bottom of the cache log 300.

In some implementations, the cache log 300 includes a field that associates each record with a virtual machine or a cache partition. For example, when the cache log 300 includes records for multiple different virtual machines, a field may indicate that a record is for a data request received from the "virtual machine A," or another identifier associated with the virtual machine A, e.g., a numeric identifier.

Figure 4:
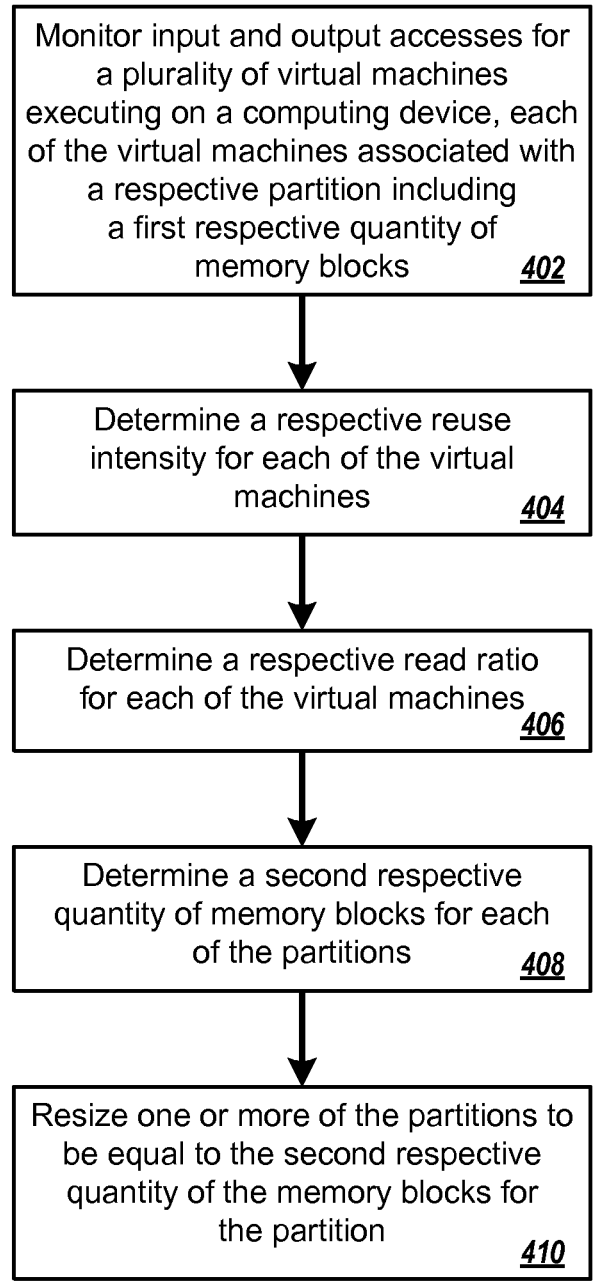
FIG. 4 shows a flowchart for an example of a process for resizing one or more virtual machine cache partitions.

FIG. 4 shows a flowchart for an example of a process 400 for resizing one or more virtual machine cache partitions as implemented by one or more data processing apparatus. For example, the process 400 can be used by the virtual machine server 102 from the environment 100.

At 402, the process monitors input and output accesses for a plurality of virtual machines executing on a computing device, each of the virtual machines associated with a respective partition including a first respective quantity of memory blocks. The computing device includes a cache with a quantity of memory blocks where each memory block in the cache is included in only one of the respective partitions. For example, the process intercepts each input and output request associated with the virtual machines and records information associated with each request. The process may record whether the request is a read or a write request, the size of the data requested, whether the data is cached, and the latency of the request.

In some implementations, the cache is a flash memory cache that is a cache for a slow disk-based backend storage included in the data processing apparatus.

At 404, the process determines a respective reuse intensity for each of the virtual machines. The reuse intensity is based on at least a quantity of unique blocks in the respective partition of the virtual machine that have been read during a first period of time.

At 406, the process determines a respective read ratio for each of the virtual machines. The read ratio is based on the input and output accesses for the virtual machine.

At 408, the process determines a second respective quantity of memory blocks for each of the partitions. The second respective quantity of memory blocks for each of the partitions is determined by optimizing a combination of cache utilities, where each cache utility is based on the reuse intensity, the read ratio, and a respective hit ratio for a particular partition. The respective hit ratio is a ratio of a total number of cache hits given a variable quantity of memory blocks and a total number of input and output accesses during a second period of time for the virtual machine associated with the particular partition. In some implementations, the total number of input and output accesses includes only read requests. In some implementations, the total number of input and output accesses includes both read requests and write requests.

The second period of time may be the same time period as the first period of time. In some examples, the second period of time corresponds to a different time period than the first period of time. The second period of time may have a different duration than the duration of the first period of time.

In some implementations, the combination of the cache utilities is a sum of the cache utilities. In some implementations, the combination of the cache utilities is a product of the cache utilities.

At 410, the process resizes one or more of the partitions to be equal to the second respective quantity of memory blocks for the partition. For example, each partition may include a current size and a target size where the process sets the target size for the partition to the second quantity of memory blocks for the partition.

In some implementations, the process adjusts the current size of the partition based on the target size of the partition and the virtual machine associated with the partition requesting data from the partition. For example, if a virtual machine requests data from the data processing apparatus and the virtual machine has a target partition size greater than the virtual machine's current partition size, the process may allocate one or more additional memory blocks to the partition associated with the virtual machine. The process may identify a memory block that is associated with a cache partition where the current size is greater than the target size and allocate the identified memory block to the partition where the current size is less than the target size.

The order of steps in the process 400 described above is illustrative only, and resizing one or more virtual machine cache partitions can be performed in different orders. For example, the process 400 may determine a read ratio for one of the virtual machines prior to determining the reuse intensity for the virtual machine.

In some implementations, the process 400 can include additional steps, fewer steps, or some of the steps can be divided into multiple steps. For example, the process 400 may perform steps 504 through 508 below as part of determining the reuse intensity. In some implementations, the process 400 may perform steps 510 through 520 as part of determining the second respective quantity of memory blocks for at least one of the partitions. In some implementations, the process 400 may determine a latency of the cache prior to determining the second respective quantity of memory blocks.

In some implementations, the process 400 may be performed for memory allocation with different types of systems. For example, a computer may use the process 400 to allocate memory to a plurality of processes, e.g., computer programs, executing on the computer, where each process includes one or more threads. In some examples, each of the processes is associated with a virtual machine. In some examples, each of the different applications executing on the virtual machine is associated with a different process. In some examples, one of the processes may be associated with a virtual machine while another process may be associated with a different computer program, e.g., a web browser. In some examples, none of the processes is associated with a virtual machine.

In some implementations, a computer may use the process 400 to allocate memory to a plurality of threads executing on the computer. For example, a thread may be the smallest sequence of programmed instructions for a computer program that can be managed independently by an operating system scheduler. For example, when a computer executes a virtual machine program as a process, the virtual machine process may include different threads for different applications executing on the virtual machine.

Figure 5:
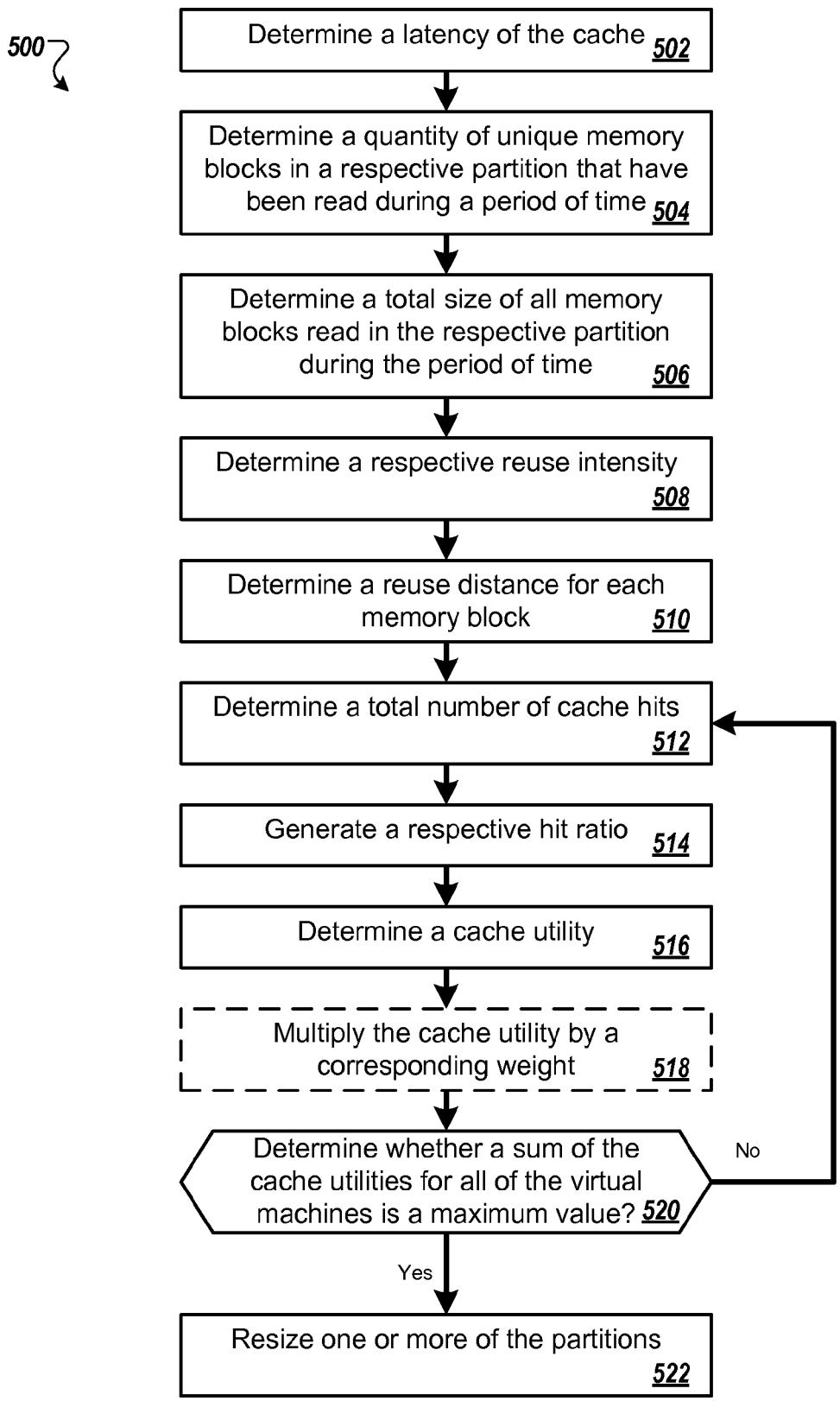
FIG. 5 shows a flowchart for an example of a process for maximizing a sum of cache utility values.

FIG. 5 shows a flowchart for an example of a process 500 for maximizing a sum of cache utility values as implemented by one or more data processing apparatus. For example, the process 500 can be used by the virtual machine server 102 from the environment 100.

At 502, the process determines a latency of the cache. The latency is based on a time to complete each of the input and output accesses. For example, the latency may be an average latency for the cache based on all data requests for any of the virtual machines. In some implementations, the latency is determined for a predetermined period of time, e.g., the previous hour.

At 504, the process determines a quantity of unique memory blocks in a respective partition that have been read during a period of time. For example, the process uses a timestamp value and a memory address to determine the quantity of unique memory blocks that have been read during the period of time.

At 506, the process determines a total size of all memory blocks read in the respective partition during the period of time. For example, the process uses a timestamp value and an IO request size to determine the total size of all memory blocks read during the period of time for the respective partition.

At 508, the process determines a respective reuse intensity. For example, for the quantity of unique memory blocks $S_{unique}$, the total size of all memory blocks read $S_{total}$, and the period of time $t_w$, the respective reuse intensity RI for a virtual machine i may be $RI_i = S_{total}(t_w * S_{unique})$.

In some implementations, the process normalizes one or more of the reuse intensities. For example, the process may normalize the reuse intensities for each of the virtual machines. In some examples, the process normalizes the reuse intensities based on a greatest reuse intensity from the reuse intensities for all of the virtual machines where the value of the greatest reuse intensity greater than or equal to the values of the other reuse intensities. For example, for the greatest reuse intensity $RI_g$, the normalized reuse intensity $RI_n$ for a virtual machine i may be $RI_{ni} = RI_i / RI_g$.

At 510, the process determines a reuse distance for each memory block. The reuse distance for a particular memory block represents a quantity of distinct memory blocks accessed between the two most recent consecutive accesses of the particular memory block. The process may determine the reuse distance based on a memory address associated with each data request and a sequence number included in an input and output log.

At 512, the process determines a total number of cache hits. The total number of cache hits may be based on the reuse distances for the memory blocks included in the corresponding partition and the second respective quantity of memory blocks for the corresponding partition. The process may determine the total number of cache hits for each of the virtual machines. For example, the total number of cache hits may be an estimated value based on a theoretical partition size defined by the second respective quantity of memory blocks.

At 514, the process generates a respective hit ratio. The process may generate the respective hit ratio for each of the virtual machines. For example, as the process increases the second respective quantity of memory blocks for each of the virtual machines, the corresponding cache hit ratio, based on the reuse distance, typically increases for virtual machines that often use the same data and will benefit from a large cache size, while the corresponding cache hit ratio will typically decrease for virtual machines that often use different data and will not have as great of a benefit from a large cache size.

At 516, the process determines a cache utility. The cache utility CU for the partition associated with virtual machine i may be $CU_i = l \times RR_i \times (H_i(s) + \alpha RI_i)$, where H is the hit ratio, s is the variable quantity of memory blocks, RI is the reuse intensity, RR is the read ratio, l is cache latency, and $\alpha$ is an adjustable weight. For example, the process determines the formulas for the cache utilities but does not determine a result for the formulas.

In some implementations, one or more of the cache utilities are based on the normalized reuse intensities. In some implementations, one or more of the cache utilities are based on non-normalized reuse intensities.

The adjustable weight for each of the virtual machines may be based on the type of cache access for which the corresponding partition is used. For example, the value of the adjustable weight may be different for partitions that are only accessed in bursts compared to partitions that are consistently accessed, e.g., that have a cache friendly workload. In some examples, an adjustable weight for a consistently accessed cache partition is greater than an adjustable weight for an infrequently accessed cache partition.

At 518, the process multiplies the cache utility by a corresponding priority weight. The process may multiply the cache utilities for each of the virtual machines by corresponding priority weights. A priority weight may represent an importance of the applications running on the corresponding virtual machine. For example, a system administrator may define the values of the priority weights. In some examples, a user may define one or more of the priority weight values.

At 520, the process determines whether a sum of the cache utilities for all of the virtual machines is a maximum value. For example, the process determines whether the sum of the cache utilities $\Sigma_{i=1}^{n} CU_i$ is a local or a global maximum value for n virtual machines, where the second respective quantities of memory blocks s are constrained by $s_1 + s_2 + \ldots + s_n = S$, where S is the total available cache size, e.g., the total number of memory blocks in the cache.

When the process determines that the sum of the cache utilities for all of the virtual machines is not a maximum value, e.g., not a local or a global maximum value, the process repeats the determination of the total number of cache hits, the generation of the estimated hit ratio, and the determination of the cache utility for at least one of the virtual machines. The process may use any appropriate algorithm to determine the maximum value.

In some implementations, if the process determines that the sum is a local maximum value, the process searches for the global maximum value. The process may use any appropriate algorithm to determine the global maximum value based on the sum of the cache utilities.

In implementations where the cache utilities are multiplied by corresponding weights, the process determines a sum of the weighted cache utilities, e.g., $\Sigma_{i=1}^{n} priority_i * CU_i$ for n virtual machines.

At 522, when the process determines that the sum of the cache utilities for all of the virtual machines is a maximum value, the process resizes one or more of the partitions. For example, the process resizes one or more of the partitions as described above with reference to step 410.

The order of steps in the process 500 described above is illustrative only, and maximizing a sum of cache utility values can be performed in different orders. For example, the process 500 may determine a total size of all memory blocks read in a partition prior to determine a quantity of unique memory blocks read in the partition. In some implementations, the process 500 determines a reuse distance for one or more memory blocks prior to determine a reuse intensity for one of the virtual machines.

In some implementations, the process 500 can include additional steps, fewer steps, or some of the steps can be divided into multiple steps. For example, the process 500 may determine a sum of the cache utilities without multiplying any of the cache utilities by the corresponding weight, e.g., without performing step 518. In some implementations, the process 500 retrieves the latency of the cache from memory. In some implementations, the process 500 determines the maximum value of the sum of the cache utilities and does not resize one or more of the partitions, e.g., perform step 522.

In some implementations, the process 500 may be performed for maximizing a sum of cache utility values with different types of systems. For example, a computer may use the process 500 to maximize a sum of cache utility values for a plurality of processes, e.g., computer programs, executing on the computer, where each process includes one or more threads. In some examples, a computer may use the process 500 to maximize a sum of cache utility values for a plurality of threads executing on the computer.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
monitoring input and output accesses for a plurality of threads executing on a computing device that includes a cache comprising a quantity of memory blocks, each of the threads being associated with a respective partition including a first respective quantity of the memory blocks, each memory block being included in only one of the respective partitions;
determining a respective reuse intensity for each of the threads, the reuse intensity being based on, at least, a quantity of unique memory blocks in the respective partition of the thread that have been read during a first period of time;
determining a respective read ratio for each of the threads, the read ratio being based on the input and output accesses for the thread;
determining a second respective quantity of memory blocks for each of the partitions, wherein determining the second respective quantity of memory block for each of the partitions comprises optimizing a combination of cache utilities, and wherein each cache utility is calculated based on a plurality of parameters including: 1) the respective reuse intensity for each of the threads, 2) the respective read ratio for each of the threads, and 3) a respective hit ratio for a particular partition, wherein the respective hit ratio is a ratio of a total number of cache hits given a variable quantity of memory blocks and a total number of input and output accesses during a second period of time for the thread associated with the particular partition; and
resizing one or more of the partitions to be equal to the second respective quantity of the memory blocks for the partition.

2. The method of claim 1 wherein determining the second respective quantity of memory blocks for each of the partitions comprises:
determining a latency of the cache based on a time to complete each of the input and output accesses; and
determining the cache utility for each of the threads using a combination of the hit ratio, the variable quantity of memory blocks, the reuse intensity, the read ratio, and the latency of the cache.

3. A method comprising:
monitoring input and output accesses for a plurality of threads executing on a computing device that includes a cache comprising a quantity of memory blocks, each of the threads being associated with a respective partition including a first respective quantity of the memory blocks, each memory block being included in only one of the respective partitions;
determining a reuse intensity for each of the threads, the reuse intensity being based on, at least, a quantity of unique memory blocks in the respective partition of the thread that have been read during a first period of time;
determining a read ratio for each of the threads, the read ratio being based on the input and output accesses for the thread;
determining a hit ratio for each partition;
determining a second respective quantity of memory blocks for each of the partitions, wherein determining the second respective quantify of memory block for each of the partitions comprises optimizing a combination of cache utilities, wherein the cache utility CU for the partition associated with thread I is $$CU_i = l \times RR_i \times (H_i(s) + \alpha RI_i)$$

wherein H is the hit ratio, s is the variable quantity of memory blocks, RI is the reuse intensity, RR is the read ratio, l is a latency of the cache, and α is an adjustable weight; and
resizing one or more of the partitions to be equal to the second respective quantity of the memory blocks for the partition.

4. The method of claim 2, wherein determining the second respective quantity of memory blocks for each of the partitions comprises:
determining a reuse distance for each memory block, the reuse distance for a particular memory block representing a quantity of distinct memory blocks accessed between the two most recent consecutive accesses of the particular memory block;
determining the total number of cache hits for each of the threads given the reuse distances for the memory blocks included in the corresponding partition and the second respective quantity of memory blocks for the corresponding partition;
generating the respective hit ratio for each of the threads; and maximizing a sum of the cache utilities for all of the threads by repeating the determination of the total number of cache hits, the generation of the estimated hit ratio, and the determination of the cache utility for at least one of the threads.

5. The method of claim 2, wherein determining the respective reuse intensity for each of the threads comprises:
determining a quantity of unique memory blocks $S_{unique}$ in the respective partition that have been read during the first period of time; and
determining a total size of all memory blocks read $S_{total}$ in the respective partition during the first period of time; and
wherein the respective reuse intensity RI for a thread i is determined from a combination of the quantity of unique memory blocks $S_{unique}$, the total size of all memory blocks read $S_{total}$, and a duration of the first period of time $t_w$.

6. The method of claim 1, wherein:
each partition includes a current size and a target size; and
resizing one or more of the partitions to be equal to the second respective quantity of memory blocks for the partition comprises setting the target size for the partition to the second quantity of memory blocks for the partition.

7. The method of claim 6, wherein resizing one or more of the partitions to be equal to the second respective quantity of memory blocks for the partition comprises:
adjusting the current size of the partition based on the target size of the partition and the thread associated with the partition requesting data from the partition.

8. A system comprising:
data processing apparatus programmed to perform operations comprising:
monitoring input and output accesses for a plurality of threads executing on a computing device that includes a cache comprising a quantity of memory blocks, each of the threads being associated with a respective partition including a first respective quantity of the memory blocks, each memory block being included in only one of the respective partitions;
determining a respective reuse intensity for each of the threads, the reuse intensity being based on, at least, a quantity of unique memory blocks in the respective partition of the thread that have been read during a first period of time;
determining a respective read ratio for each of the threads, the read ratio being based on the input and output accesses for the thread;
determining a second respective quantity of memory blocks for each of the partitions, wherein determining the second respective quantity of memory block for each of the partitions comprises optimizing a combination of cache utilities, and wherein each cache utility is calculated based on a plurality of parameters including: 1) the respective reuse intensity for each of the threads, 2) the respective read ratio for each of the threads, and 3) a respective hit ratio for a particular partition wherein the respective hit ratio is a ratio of a total number of cache hits given a variable quantity of memory blocks and a total number of input and output accesses during a second period of time for the thread associated with the particular partition; and
resizing one or more of the partitions to be equal to the second respective quantity of the memory blocks for the partition.

9. The system of claim 8 wherein determining the second respective quantity of memory blocks for each of the partitions comprises:
determining a latency of the cache based on a time to complete each of the input and output accesses; and
determining the cache utility for each of the threads using a combination of the hit ratio, the variable quantity of memory blocks, the reuse intensity, the read ratio, and the latency of the cache.

10. The system of claim 9, wherein the cache utility CU for the partition associated with thread I is $$CU_i = l \times RR_i \times (H_i(s) + \alpha RI_i)$$

where H is the hit ratio, s is the variable quantity of memory blocks, RI is the reuse intensity, RR is the read ratio, l is the latency of the cache, and a is an adjustable weight.

11. The system of claim 9, wherein determining the second respective quantity of memory blocks for each of the partitions comprises:
determining a reuse distance for each memory block, the reuse distance for a particular memory block representing a quantity of distinct memory blocks accessed between the two most recent consecutive accesses of the particular memory block;
determining the total number of cache hits for each of the threads given the reuse distances for the memory blocks included in the corresponding partition and the second respective quantity of memory blocks for the corresponding partition;
generating the respective hit ratio for each of the threads; and
maximizing a sum of the cache utilities for all of the threads by repeating the determination of the total number of cache hits, the generation of the estimated hit ratio, and the determination of the cache utility for at least one of the threads.

12. The system of claim 9, wherein determining the respective reuse intensity for each of the threads comprises:
determining a quantity of unique memory blocks $S_{unique}$ in the respective partition that have been read during the first period of time; and
determining a total size of all memory blocks read $S_{total}$ in the respective partition during the first period of time; and
wherein the respective reuse intensity RI for a thread i is determined from a combination of the quantity of unique memory blocks $S_{unique}$, the total size of all memory blocks read $S_{total}$, and a duration of the first period of time $t_w$.

13. The system of claim 8, wherein:
each partition includes a current size and a target size; and
resizing one or more of the partitions to be equal to the second respective quantity of memory blocks for the partition comprises setting the target size for the partition to the second quantity of memory blocks for the partition.

14. The system of claim 13, wherein resizing one or more of the partitions to be equal to the second respective quantity of memory blocks for the partition comprises:
adjusting the current size of the partition based on the target size of the partition and the thread associated with the partition requesting data from the partition.

15. A non-transitory machine readable storage medium embodying computer software, the computer software causing a computer to perform a method, the method comprising:
monitoring input and output accesses for a plurality of threads executing on a computing device that includes a cache comprising a quantity of memory blocks, each of the threads being associated with a respective partition including a first respective quantity of the memory blocks, each memory block being included in only one of the respective partitions;

determining a respective reuse intensity for each of the threads, the reuse intensity being based on, at least, a quantity of unique memory blocks in the respective partition of the thread that have been read during a first period of time;

determining a respective read ratio for each of the threads, the read ratio being based on the input and output accesses for the thread;

determining a second respective quantity of memory blocks for each of the partitions, wherein determining the second respective quantity of memory block for each of the partitions comprises optimizing a combination of cache utilities, and wherein each cache utility is calculated based on a plurality of parameters including: 1) the respective reuse intensity for each of the threads, 2) the respective read ratio for each of the threads, and 3) a respective hit ratio for a particular partition wherein the respective hit ratio is a ratio of a total number of cache hits given a variable quantity of memory blocks and a total number of input and output accesses during a second period of time for the thread associated with the particular partition; and resizing one or more of the partitions to be equal to the second respective quantity of the memory blocks for the partition.

16. The machine readable storage medium of claim 15 wherein determining the second respective quantity of memory blocks for each of the partitions comprises:

determining a latency of the cache based on a time to complete each of the input and output accesses; and determining the cache utility for each of the threads using a combination of the hit ratio, the variable quantity of memory blocks, the reuse intensity, the read ratio, and the latency of the cache.

17. The machine readable storage medium of claim 16, wherein the cache utility CU for the partition associated with thread I is $$CU_i = l \times RR_i \times (H_i(s) + \alpha RI_i)$$

where H is the hit ratio, s is the variable quantity of memory blocks, RI is the reuse intensity, RR is the read ratio, l is the latency of the cache, and a is an adjustable weight.

18. The machine readable storage medium of claim 16, wherein determining the second respective quantity of memory blocks for each of the partitions comprises:

determining a reuse distance for each memory block, the reuse distance for a particular memory block representing a quantity of distinct memory blocks accessed between the two most recent consecutive accesses of the particular memory block;

determining the total number of cache hits for each of the threads given the reuse distances for the memory blocks included in the corresponding partition and the second respective quantity of memory blocks for the corresponding partition;

generating the respective hit ratio for each of the threads; and maximizing a sum of the cache utilities for all of the threads by repeating the determination of the total number of cache hits, the generation of the estimated hit ratio, and the determination of the cache utility for at least one of the threads.

19. The machine readable storage medium of claim 16, wherein determining the respective reuse intensity for each of the threads comprises:

determining a quantity of unique memory blocks $S_{unique}$ in the respective partition that have been read during the first period of time; and determining a total size of all memory blocks read $S_{total}$ in the respective partition during the first period of time; and wherein the respective reuse intensity RI for a thread i is determined from a combination of the quantity of unique memory blocks $S_{unique}$, the total size of all memory blocks read $S_{total}$, and a duration of the first period of time $t_w$.

20. The machine readable storage medium of claim 15, wherein:

each partition includes a current size and a target size; and resizing one or more of the partitions to be equal to the second respective quantity of memory blocks for the partition comprises setting the target size for the partition to the second quantity of memory blocks for the partition.

* * * * *